United States Patent [19]
Stark et al.

[11] Patent Number: 5,536,290
[45] Date of Patent: Jul. 16, 1996

[54] PLEATED CARTRIDGE FILTER ATTACHMENT FOR TOP LOADING FILTER ASSEMBLIES

[75] Inventors: Stephen K. Stark; Erik H. Wildt, both of Wilmington, Del.

[73] Assignee: W. L. Gore & Associates, Inc., Newark, Del.

[21] Appl. No.: 390,007

[22] Filed: Feb. 17, 1995

[51] Int. Cl.$^6$ ............................................. B01D 46/00
[52] U.S. Cl. ............................................. 55/498; 55/502
[58] Field of Search ................... 55/341.1, 376, 55/377, 378, 379, 498, 502, 510, 521

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,025,679 | 5/1977 | Denny | 428/91 |
| 4,096,227 | 6/1978 | Gore | 264/210 R |
| 4,110,392 | 8/1978 | Yamazaki | 264/127 |
| 4,138,234 | 2/1979 | Kubesa | 55/498 |
| 4,187,390 | 2/1980 | Gore | 174/102 R |
| 4,292,057 | 9/1981 | Ulvestad et al. | 55/302 |
| 4,436,536 | 3/1984 | Robinson | 55/498 |
| 4,443,237 | 4/1984 | Ulvestad | 55/498 |
| 4,765,811 | 8/1988 | Beckon | 55/498 |
| 4,955,996 | 9/1990 | Edwards et al. | 55/498 |
| 5,207,812 | 5/1993 | Tronto et al. | 55/498 |
| 5,350,515 | 9/1994 | Stark et al. | 55/498 |

*Primary Examiner*—C. Scott Bushey
*Attorney, Agent, or Firm*—David J. Johns

[57] ABSTRACT

The present invention is an improved apparatus for capping the end of a pleated filter cartridge. The apparatus includes a two section assembly having a first end section with at least an inner flange and a flared second section that nests within the first end section and defines an annular space adapted to receive a pleated filter media. The pleated filter media is preferably potted within the annular space to form a tight seal that is not prone to leakage. The filter assembly of the present invention is a distinct improvement over previous filter end cap assemblies, having fewer parts and being easier to manufacture, install, and use.

4 Claims, 5 Drawing Sheets

5,536,290

PLEATED CARTRIDGE FILTER ATTACHMENT FOR TOP LOADING FILTER ASSEMBLIES

FIELD OF THE INVENTION

The present invention relates to apparatus for attachment of filter bags or cartridges to filtration apparatus.

BACKGROUND OF THE INVENTION

Retrofitting pleated cartridge filters into pulse-jet dust collectors designed for filter bags (i.e., unpleated filter media) has been a common practice for over ten years. The primary benefit is the large increase in filtration surface area, allowing the dust collector to operate at a lower differential pressure. In some cases the intention is to increase the air handling capability of the dust collection system without making any physical changes to the collector besides replacing the filter elements.

Methods for attaching the pleated cartridges to a tube sheet have been developed for both top and bottom load systems. The top load systems are favored, particularly in larger dust collectors, because of the easier clean-side access for installation and removal.

One method of top load attachment is a molded polyurethane structure at the top of the cartridge. An elastomer structure is provided having a groove, corresponding to the thickness of the tube sheet, that can be snapped into a tube sheet hole after sliding the cartridge through and pushing downward until the groove snaps into the tube sheet.

This attachment method has several drawbacks. When the molded polyurethane structure is designed to fit tightly enough to provide a leak-free seal, the cartridges are difficult to install and remove. Also, there are slight variations in the tolerances of the tube sheet holes that can result in air leaks. Over time, the polyurethane sealing structures become hard and embrittled or may change in dimension due to changes in temperature and/or through chemical attack. Subsequent failure of the seals results in dust emissions and premature failure of the filter elements.

Another popular method of top load attachment utilizes a vertical collar that is force-fit through a snap band sleeve of fabric material, similar to the top removal support for dust collector bags described in U.S. Pat. No. 4,292,057 to Ulvestad et al. In the modification for pleated cartridge filters, the collar assembly is a separate part that must be attached to the cartridge. This is accomplished by incorporating two or three threaded studs in the top end cap of the cartridge. The collar assembly, which includes a venturi and handle, is placed over the studded end cap. A gasket is required between the collar assembly and the studded end cap. Nuts and lock-washers are used to secure them before installation in the collector.

This method forms a durable air-tight seal between the cartridge and the tube sheet. However, the need to use separate components significantly adds to the cost of this method of attachment. The separate collar, end cap with two or three threaded studs, gasket, associated hardware, and the labor required for assembly are considered overly complicated to employ and are believed to add needless time and effort to filter maintenance.

Accordingly, it is a primary purpose of the present invention to provide an improved filter cartridge attachment means.

SUMMARY OF THE INVENTION

The present invention is an improved filter cartridge in which a sealing collar is integrated into the structure of the end cap, thereby eliminating the need for separate components or end cap structures to secure them.

The top end cap of the cartridge of the present invention comprises two components that are nested together prior to assembly. The first component is an open end section with an outside diameter larger than the tube sheet hole and the body of the pleated cartridge. The second component is a cylindrical section with a flared end that nests into the open end section. This second component is larger than the body of the cartridge but slightly smaller than the tube sheet opening so it can be force-fit through a fabric snap band. The tolerances are designed such that the flared end of the second component fits securely into the end section when the two pieces are nested together.

When the cartridge is assembled, a potting compound or similar sealant material is poured into an annular space defined between the inner diameter of the open end section and an inner flange of the second component. This potting material is dispensed as a liquid and is subsequently hardened into a solid. After dispensing the potting material, the pleated filter media is potted into the assembly of the end cap. When the potting material hardens, the pleated filter media is secured in the end cap and an air-tight seal is formed. In addition, the hardened potting material acts as an adhesive and sealant between the two nested components of the end cap.

The bottom of the filter may be a closed metal end cap that can be attached to the pleated filter media using the same potting compounds used in the top assembly. In some cases the cap may be replaced by a molded thermoset or thermoplastic material.

The final cartridge assembly is attached to the dust collector from the top surface of a tube sheet. First, a fabric snap band is installed around the edge of the tube sheet hole. The cartridge assembly is lowered through the hole surrounded by the fabric snap band. When the top end cap assembly reaches the fabric snap band, a downward force is applied to the top end cap so the cylindrical inner section of the top end cap assembly is forced through the fabric snap band. The assembly is then pushed down until the top of the fabric snap band is seated in the annular space defined by the outer flange of the top end cap and the outside surface of the flared second section of the end cap assembly.

BRIEF DESCRIPTION OF THE DRAWINGS

The present invention may be better understood with reference to the attached drawings when considered in light of the following specification, in which.

DETAILED DESCRIPTION OF THE INVENTION

The present invention comprises a pleated cartridge filter with a two-component top end cap assembly.

Figure 1:
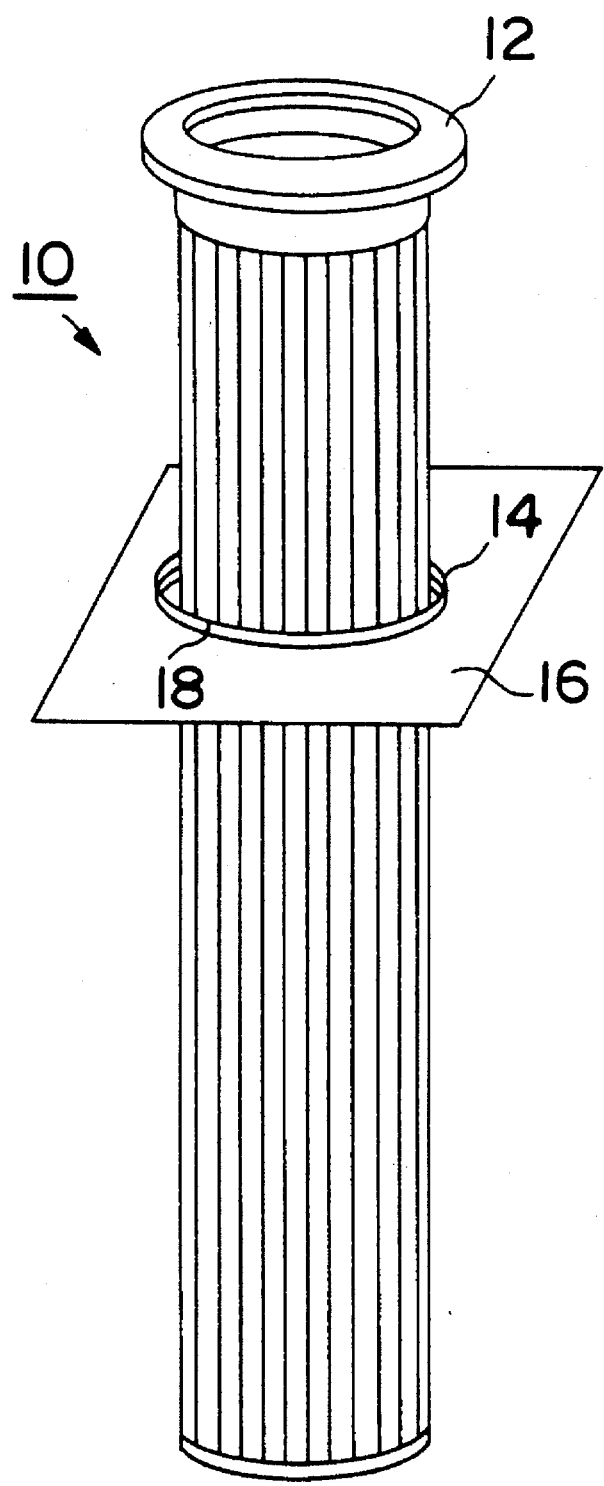
FIG. 1 is a three-quarter elevation view of a pleated filter cartridge attached to a top end cap of the present invention, the filter cartridge shown partially inserted into a tube sheet.

Shown in FIG. 1 is a pleated filter cartridge 10 incorporating an end cap assembly 12 of the present invention. The filter cartridge 10 is adapted to be inserted into one of a series of openings 14 in a tube sheet assembly 16 found in most top load filtration units. In order to establish a tight fit around the end cap assembly 12, a gasket member 18, such as a "snap band" collar explained in greater detail below, is provided lining the opening 14. The gasket member 18 is preferably formed from a soft, resilient material that allows the filter cartridge 10 and the end cap assembly 12 to slide easily into and out of the opening 14 while assuring that a snug fit is provided around the end cap assembly to prevent leakage during use.

Figure 2:
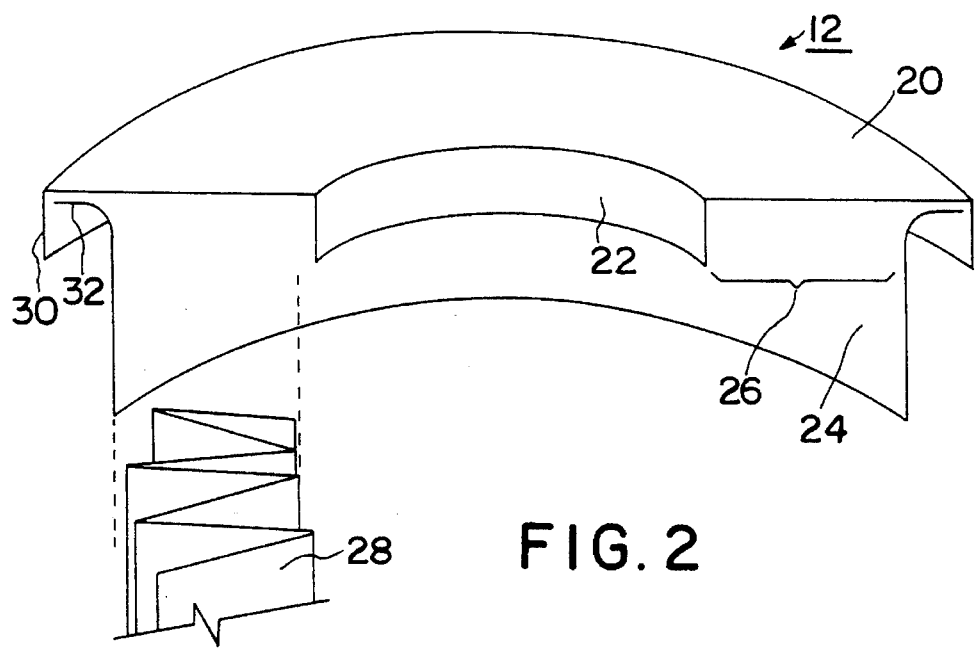
FIG. 2 is a three-quarter cross-section view of the end cap of the present invention.
Figure 3:
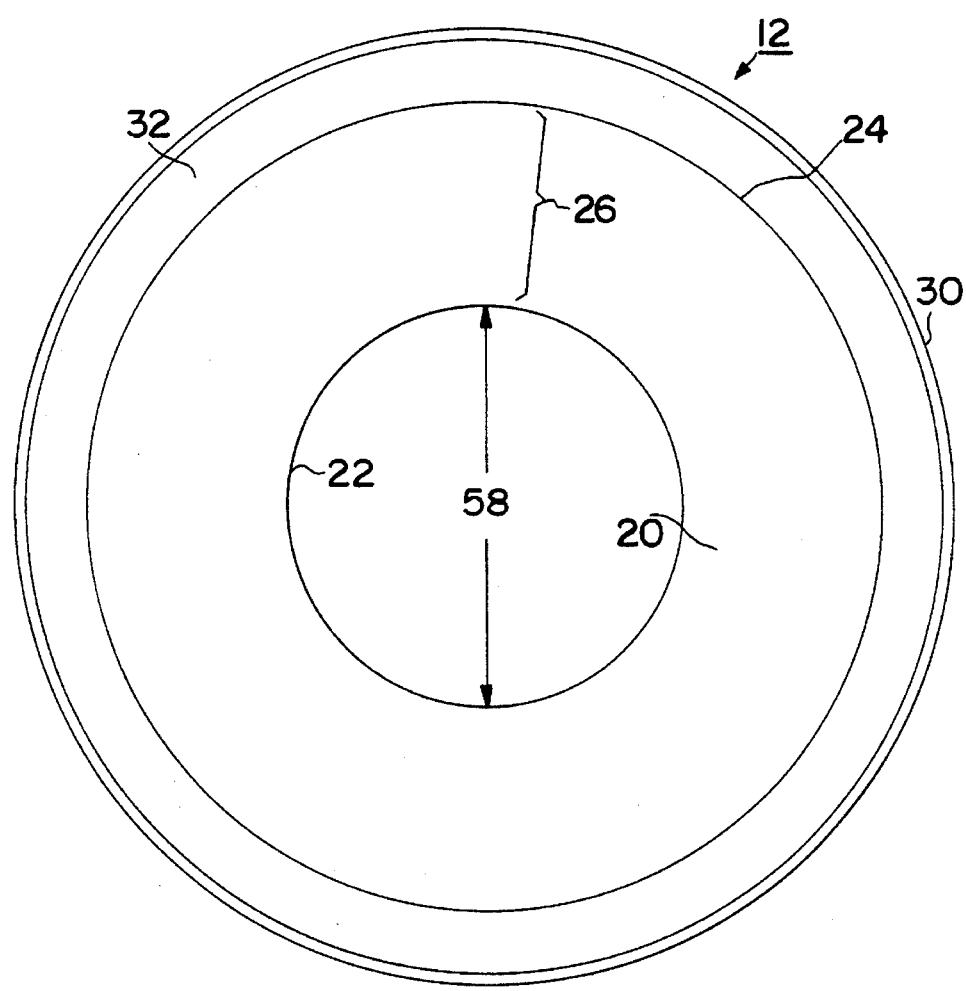
FIG. 3 is a bottom plan view of the end cap of the present invention.

The end cap assembly 12 of the present invention is shown in greater detail in FIGS. 2 and 3. The end cap comprises two components, a first end section 20, having an inner diameter flange 22, and a second flared section 24. As is shown, the second flared section 24 is adapted to "nest" or fit within the first end section 20 so as to define an annular space 26 between the flared section 24 and the inner flange 22. Preferably an outer diameter flange 30 is also provided on the first end section 20. This outer flange 30 allows better attachment around a snap band collar 18.

The two sections 20, 24 may be attached together merely by providing a snug fit between the two, whereby the flared section 24 wedges within the first end section 22 and is held in place by friction against the outer flange 30. In this regard, the flared section is oriented outwardly and abuts the outer flange 30. More preferably, the two section 20, 24 are held together by application of an adhesive, such as epoxy or other polymer, around part or all of a rim 32 of the flared section 24. This bonding process is assisted if a snug fit is already provided between the two sections 20, 24. Additionally, it should be appreciated that the application of a potting compound, as is described below, may also assist in bonding the two sections together.

The annular space is proportioned to receive a pleated filter element 28 and hold it between the inner flange 22 and the flared section 24. It is preferred that the pleated filter element 28 is held in place within the annular space using a "potting compound." The potting compound may comprise any material that will fill in any gaps between the pleats of the filter element 28 and any open spaces within the annular space 26 so as to avoid any leaks around the filter element through the end cap assembly. The potting compound also serves to hold the end cap assembly 12 and the filter element 28 together during use. Suitable potting materials for use with the present invention include: single or multi-component materials which can be dispensed as a liquid and subsequently hardened such as polyvinylchloride plastisols, polyurethanes, epoxies, silicones or ceramics.

There are numerous advantages to the construction of an end cap assembly of the present invention over previous end cap devices. First, the use of two tightly fitted sections and potting compound to hold the filter element in place produces a very efficient solitary filter assembly. Unlike previous devices that had to be disassembled and reassembled by maintenance workers, with nuts, washers, gaskets, and other small parts prone to loss or damage, the entire unit of the present invention can be instantly removed and replaced in minimal time and with minimal effort. Second, the potted attachment of the filter element to the end cap, eliminating the gasket, also assures that bypass around the end of the filter element is effectively eliminated. Third, the use of only two pieces in the end cap assembly decreases the cost of parts and assembly and also makes the entire end cap assembly lighter than previous devices.

Figure 5:
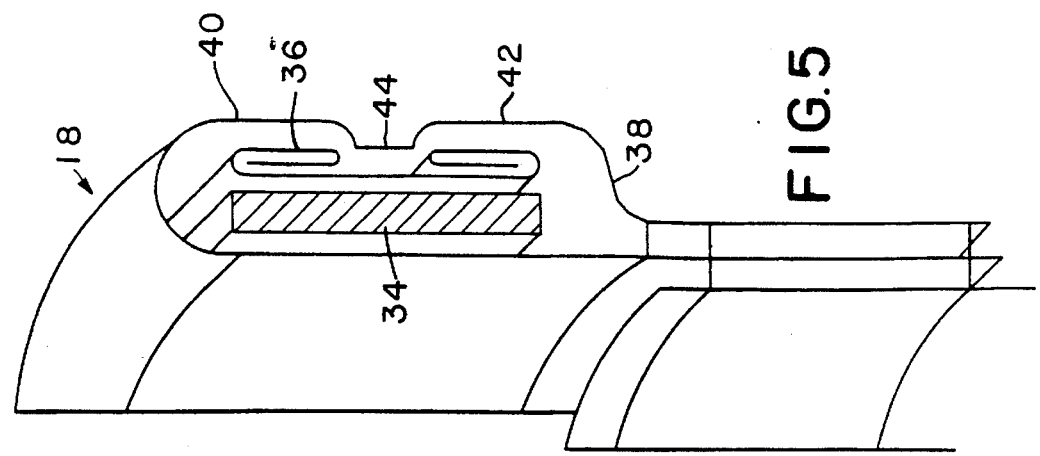
FIG. 5 is a cross-section segment of a snap band for use with the present invention.
Figure 4:
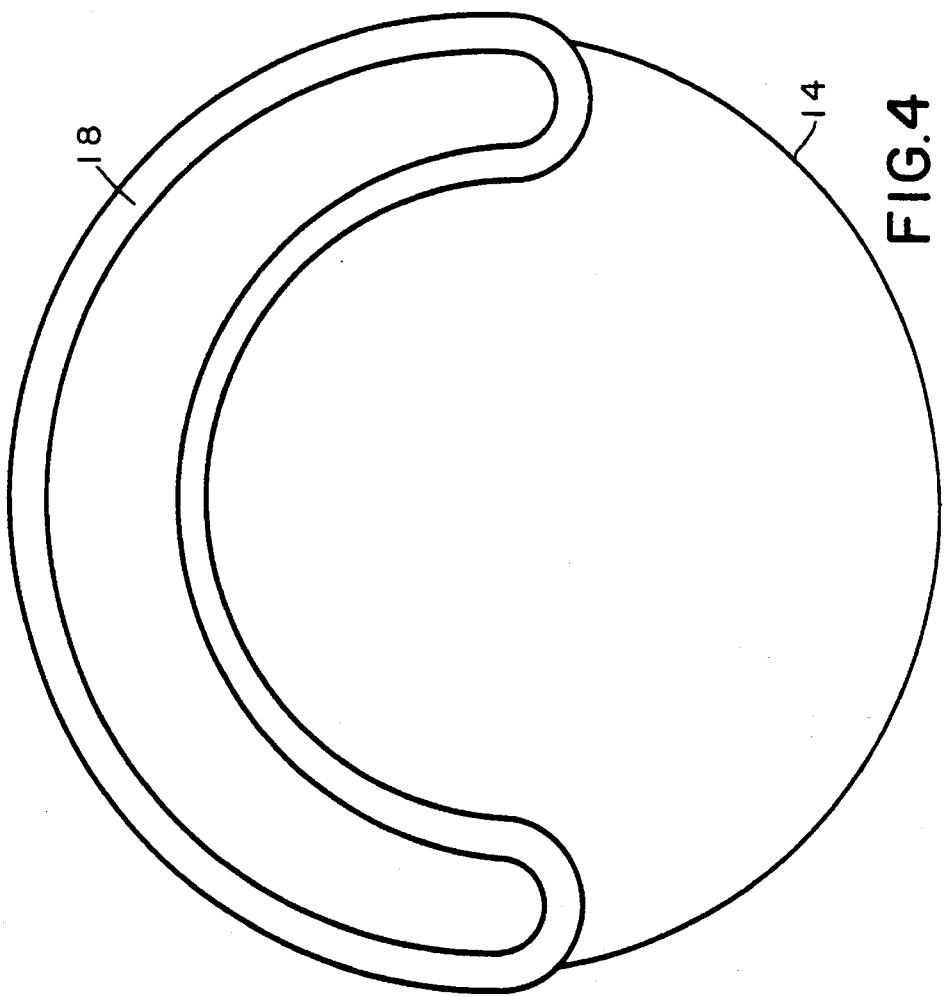
FIG. 4 is a snap band, shown in a compressed orientation, fitted into a tube sheet hole.

As has been noted, it is preferred to install a filter assembly 10 of the present invention in an opening having a snap band collar 18. One embodiment of such a collar 18 is shown in FIGS. 4 and 5. This collar comprises a resilient member 36, a spring element 34, and an outer casing 38. The resilient member 36 is preferably constructed from polyester, polyaramid or polytetrafluoroethylene felt and performs the function of conforming around the end cap assembly 12 and forming a snug fit therewith in conjunction with the outer casing 38. The spring element 34 is preferably constructed from a spring steel, such as, 301 stainless steel, and functions to provide a radial sealing force and resilience to the snap band collar 18. The spring element is shaped to provide two ridges 40, 42 and an annular indented groove 44. The two ridges 40, 42 and the groove 44 cooperate to lock the snap ring in place around an opening 14 in a tube sheet 16. The outer casing 38 is also preferably constructed from a polyester, polyaramid or polytetrafluoroethylene felt or fabric material that is durable yet will allow the end cap assembly 12 to slide readily through it into a properly mounted position.

As is shown in FIG. 4, the snap band collar 18 may be mounted in an opening 14 by merely distorting the collar 18 into a folded position (i.e., a "kidney bean" shape), as shown, positioning the distorted collar 18 into the opening 14, and then allowing the collar 18 to spring into position within the opening 14. It should be appreciated that other gasket elements may be employed within the opening 14 of the tube sheet of the present invention without departing from the present invention. For example, a molded elastomeric ring of natural rubber, neoprene, polyurethane, or silicone may be used in place of the fabric snap band collar.

By supplying an outer flange 30 to the end cap assembly 12 of the present invention, it allows the end cap to straddle the snap band collar once the filter cartridge is installed in a tube sheet. In this manner, better structural support is provided for the filter cartridge (especially if the outer flange actually extends to touching the tube sheet in the fully installed position). Moreover, the outer flange 30 also provides an additional sealing surface to ensure that leakage will not occur around the end cap assembly during use.

It has been common practice with previous filter cartridge devices to provide some form of handle to assist in removing the filter cartridge from the tube sheet. Typically these handles comprised a similar bent metal loop attached across the filter cartridge. Unfortunately, these handles have been very prone to failure, with the handles breaking off or coming undone during the filter exchange process. Although the present invention may be provided with a similar handle device, it is preferred that the removal of the filter assembly of the present invention be accomplished through more reliable means.

Figure 6:
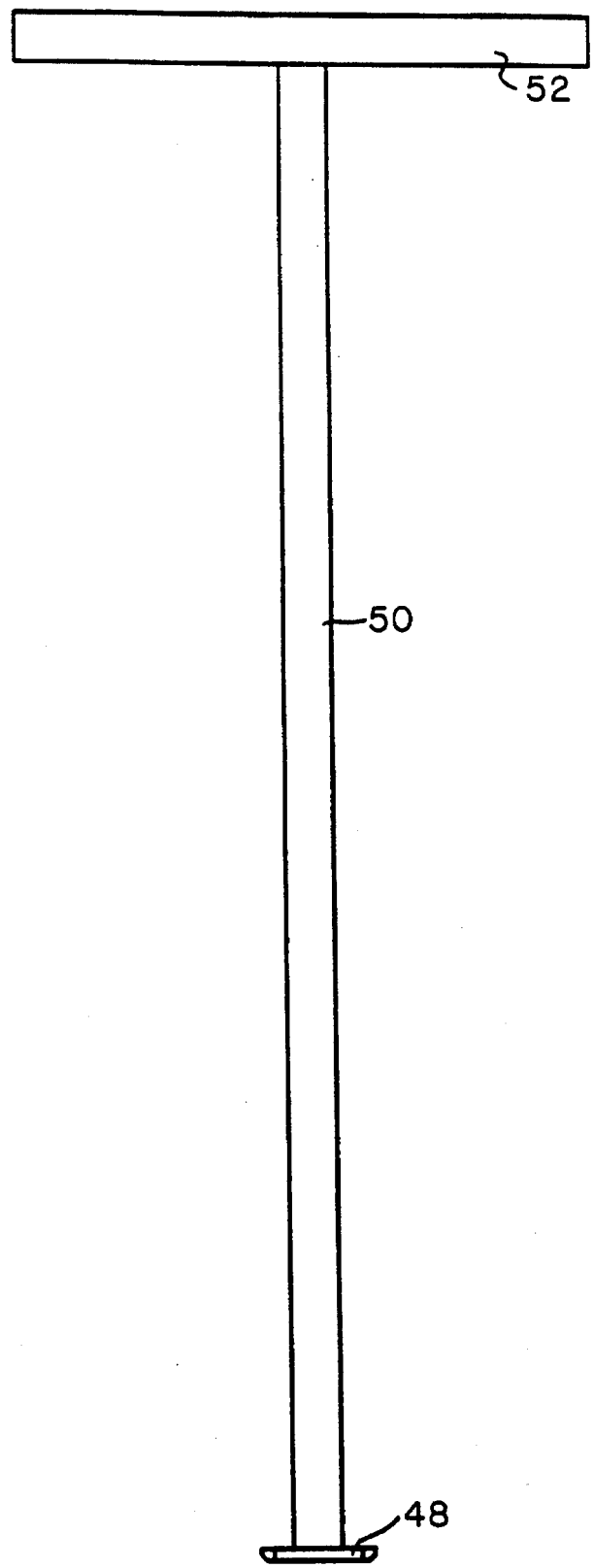
FIG. 6 is a front elevation view of a cartridge removal tool for use with the present invention.
Figure 7:
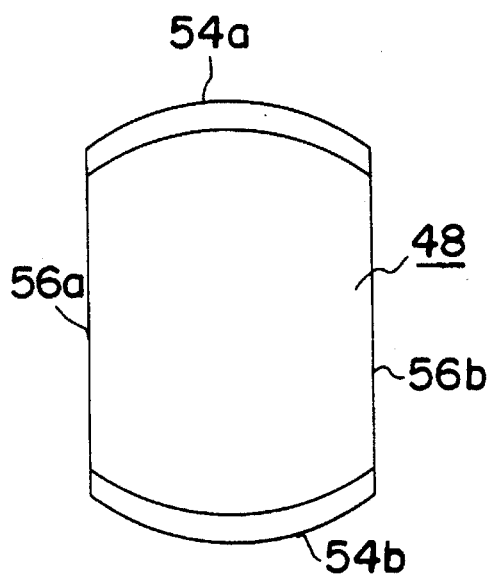
FIG. 7 is an enlarged end view of the operative end of the cartridge removal tool of FIG. 6.
Figure 8:
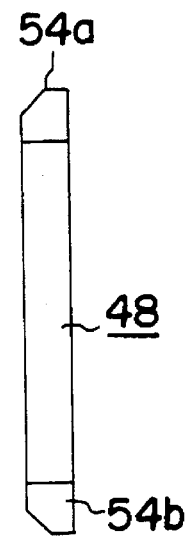
FIG. 8 is an enlarged side view of the operative end of the cartridge removal tool of FIG. 6.

Shown in FIGS. 6 through 8 is a filter removal tool 46 that facilitates the exchange of filter cartridges of the present invention. The filter removal tool 46 comprises an operative end or "head" 48, a long neck 50 (e.g., approximately 30 inches long), and a perpendicular handle 52. The head 48 of the tool is asymmetrical, having two short rounded ends 54a, 54b and two long flat sides 56a, 56b. As is shown in FIG. 8, the rounded ends 54 are preferably angled in cross-section (e.g., at about a 45° angle).

The head 48 is adapted to fit within a center opening 58 in the end cap assembly of the present invention (i.e., defined by inner flange 22) on an angle. Once placed within the center opening 58, the device is then straightened to position the neck 50 essentially parallel to the longitudinal axis of the filter cartridge. When placed in this position, the head locks under the inner flange 22, and the cartridge can be easily removed by pulling on the handle 52. Once the cartridge has been loosened from the tube sheet, the removal device 50 can be easily separated from the cartridge by again tilting it at an angle. Since a single removal device 50 can be employed with many filter cartridges, it can be constructed from very durable materials that will withstand the rigors of the filter environment, such as 1"×1" mild steel tubing.

Although virtually any form of filter media may be employed with the present invention, it is particularly preferred to employ a pleated filter media such as a woven fabric, nonwoven needle felt, spunbonded, or spunlace material. The filter media preferably comprises cellulose, polyester, polypropylene, acrylic, polyimide, polyamide, polyaramid, glass, or polytetrafluoroethylene fibers. The filter media may also be laminated with an expanded polytetrafluoroethylene (PTFE) membrane, such as that prepared in accordance with one or more of U.S. Pat. Nos. 4,187,390 to Gore, 4,110,392 to Yamazaki, 4,096,227 to Gore, 3,962,153 to Gore, 3,953,566 to Gore, and 4,025,679 to Denny.

Particularly preferred for use with the present invention comprises a filter media of a 4–12 oz/yd$^2$ layer of spunbonded polyester laminated with an expanded PTFE membrane. The pleat structure and filter construction is made in accordance with U.S. Pat. No. 5,207,812 to Tronto.

The sections 20, 24 of the end cap may be constructed from any suitable material, such as carbon steel, galvanized steel, stainless steel, aluminum, brass, or injection molded plastic such high density polyethylene, polypropylene, nylon or polyvinylchloride.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A pleated cartridge filter adapted to be attached to a tube sheet that comprises:

an end cap including a first end section component, having an inner diameter flange and an outer diameter flange, and a second flared component, the second component nested within the first component around the inner flange, defining an annular space between the second component and the inner flange, the second component having a flared section oriented outwardly and abutting the outer flange;

pleated filter media mounted in the annular space of the end cap;

potting compound along the pleated filter media within the end cap and preventing leakage around the filter media.

2. The cartridge filter of claim 1 wherein a snap band is provided to provide a tight fit between the cartridge filter and the tube sheet.

3. The cartridge filter of claim 2 wherein the outer diameter flange is adapted to fit around the snap band in the tube sheet.

4. The cartridge filter of claim 1 wherein the potting compound is selected from the group consisting of polyvinylchloride plastisols, polyurethanes epoxies, silicones and ceramics.

* * * * *